United States Patent
Ishizaki (10) Patent No.: US 7,824,571 B2
(45) Date of Patent: Nov. 2, 2010

(54) POLYMERIZABLE LIQUID CRYSTAL COMPOSITION, OPTICAL DEVICE, METHOD OF MANUFACTURING OPTICAL DEVICE, AND LIQUID CRYSTAL DISPLAY

(75) Inventor: Koji Ishizaki, Tokyo (JP)

(73) Assignee: Sony Corporation, Tokyo (JP)

( * ) Notice: Subject to any disclaimer, the term of this patent is extended or adjusted under 35 U.S.C. 154(b) by 351 days.

(21) Appl. No.: 11/761,114

(22) Filed: Jun. 11, 2007

(65) Prior Publication Data

US 2008/0180608 A1 Jul. 31, 2008

(30) Foreign Application Priority Data

Jun. 13, 2006 (JP) ............................ P2006-162992

(51) Int. Cl.
C09K 19/00 (2006.01)
C09K 19/06 (2006.01)
C09K 19/52 (2006.01)
G02F 1/03 (2006.01)

(52) U.S. Cl. .............................. 252/299.01; 252/299.1; 252/299.6; 430/20; 428/1.1; 428/1.3

(58) Field of Classification Search ............. 252/299.1, 252/299.6, 299.01; 428/1.1, 1.3; 430/20
See application file for complete search history.

(56) References Cited

U.S. PATENT DOCUMENTS

| 7,332,201 B2 * | 2/2008 | Ishizaki et al. ............... 428/1.1 |
| 7,387,857 B2 * | 6/2008 | Oomori et al. ................ 430/20 |
| 2006/0182900 A1 * | 8/2006 | Kim et al. ................... 428/1.31 |

FOREIGN PATENT DOCUMENTS

| JP | 07-199173 | 8/1995 |
| JP | 2002-536529 | 10/2002 |
| JP | 2005-060373 A | 3/2005 |
| JP | 2005-097357 A | 4/2005 |
| JP | 2005-272560 | 10/2005 |
| JP | 2005-534993 | 11/2005 |
| JP | 2006-307150 A | 11/2006 |
| JP | 2007-131740 A | 5/2007 |
| JP | 2007-138099 A | 6/2007 |
| JP | 2007-191442 A | 8/2007 |
| JP | 2007-163894 | 1/2009 |
| JP | 2007-264480 | 4/2009 |

OTHER PUBLICATIONS

Office Action for Japanese Application No. 2006-162992 dated Jan. 19, 2010.
Japanese Patent Office, Office Action issued in Patent Application JP 2006-162992, on Oct. 20, 2009.

* cited by examiner

Primary Examiner—Geraldina Visconti
(74) Attorney, Agent, or Firm—Sonnenschien Nath & Rosenthal LLP

(57) ABSTRACT

A polymerizable liquid crystal composition containing a polymerizable liquid crystal monomer capable of achieving hybrid alignment on an alignment processed surface and at least one of a photopolymerization initiator represented by the following general formula (1) and a photopolymerization initiator represented by the following general formula (2):

General Formula (1)

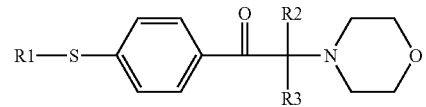

General Formula (2)

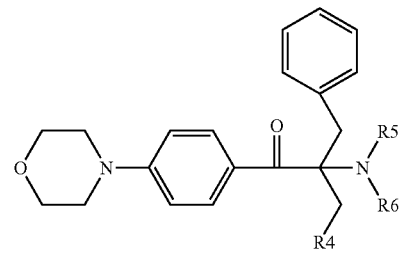

wherein R1 to R6 each independently represents a hydrogen atom or a methyl group.

13 Claims, 4 Drawing Sheets

POLYMERIZABLE LIQUID CRYSTAL COMPOSITION, OPTICAL DEVICE, METHOD OF MANUFACTURING OPTICAL DEVICE, AND LIQUID CRYSTAL DISPLAY

CROSS REFERENCES TO RELATED APPLICATIONS

The present invention contains subjects related to Japanese Patent Application JP 2006-162992 filed in the Japan Patent Office on Jun. 13, 2006, the entire contents of which being incorporated herein by reference.

BACKGROUND OF THE INVENTION

1. Field of the Invention

The invention relates to a polymerizable liquid crystal composition which is used for optical devices having a liquid crystal molecule tilt-aligned therein, an optical device using this composition, a method of manufacturing this optical device, and a liquid crystal display using this optical device.

2. Description of the Related Art

As an optical device to be built into a liquid crystal display, optical devices made of a liquid crystal material of a polymerization type are known and widely used as an absorption type circular polarizing plate which configures a liquid crystal display (for example, a λ/4 retardation layer and a λ/2 retardation layer), a linear polarizing plate, or a viewing angle compensation layer of various liquid crystal modes.

For example, in liquid crystal displays of an ECB mode, it is known that a wide viewing angle is obtained by providing, as a retardation layer, an optical device with a so-called hybrid structure having a liquid crystal molecule tilt-aligned therein. In manufacturing such an optical device (retardation layer) having a liquid crystal molecule tilt-aligned therein, it is disclosed to use a polymerizable liquid crystal compound as a composition mixed with a photopolymerization initiator and a surfactant and to use, as the photopolymerization initiator, benzoin ethers, benzophenones, acetophenones, benzyl ketals, acyl phosphine oxides, etc. (see, JP-A-2005-272560 (Patent Document 1)).

Also, in liquid crystal displays, it is devised to realize thinning of the display by providing the foregoing retardation layer inside a liquid crystal cell having a liquid crystal layer interposed between two substrates and subjecting it to in-cell processing. As one example of such a configuration that a retardation layer is subjected to in-cell processing, a configuration that retardation layers whose retardation is changed for every pixel of respective RGB colors are provided is disclosed, too (see JP-A-7-199173 (Patent Document 2)).

SUMMARY OF THE INVENTION

Now, in the configuration that a retardation layer is subjected to in-cell processing, a heat treatment in a subsequent process is applied to the retardation layer formed on a substrate, too. For that reason, the retardation layer is also required to have heat resistance to some degree.

However, retardation layers using a related-art polymerizable liquid crystal material, in particular retardation layers of the foregoing hybrid structure did not have sufficient heat resistance against the in-cell processing and were easily changed in the retardation by the heat treatment. Thus, it was difficult to keep expected characteristics.

Under these circumstances, it is desirable to provide a polymerizable liquid crystal composition capable of preparing an optical device of a hybrid structure with excellent heat resistance; to provide an optical device of a hybrid structure with excellent heat resistance; and to provide a liquid crystal display capable of realizing in-cell processing of an optical device (retardation layer) of a hybrid structure thereby.

According to an embodiment of the invention, there is provided a polymerizable liquid crystal composition containing a polymerizable liquid crystal monomer capable of achieving hybrid alignment on an alignment processed surface and at least one of a photopolymerization initiator represented by the following general formula (1) and a photopolymerization initiator represented by the following general formula (2).

General Formula (1)

General Formula (2)

In the general formula (1), R1 to R3 each independently represents a hydrogen atom or a methyl group.

In the general formula (2), R4 to R6 each independently represents a hydrogen atom or a methyl group.

A compound containing at least two polymerizable functional groups is used as the polymerizable liquid crystal monomer capable of achieving hybrid alignment. For example, a material represented by the following general formula (3) is used as the compound containing two polymerizable functional groups.

General Formula (3)

In the general formula (3), $W^1$ and $W^2$ each independently represents a single bond, —O—, —COO—, or —OCO—; $Y^1$ and $Y^2$ each independently represents —COO— or —OCO—; p and q each independently represents an integer of from 2 to 18; and a hydrogen atom or atoms in each of the three 1,4-phenylene groups present in the formula may be independently substituted with one or more of an alkyl group, an alkoxy group or an alkanoyl group each having from 1 to 7 carbon atoms, a cyano group, and a halogen atom.

Also, according to an embodiment of the invention, there is provided an optical device having a polymerizable liquid crystal monomer hybrid-aligned therein by using such a polymerizable liquid crystal composition.

According to this, by using the photopolymerization initiator represented by the general formula (1) or (2), it has been confirmed that the heat resistance of an optical device having a polymerizable liquid crystal monomer hybrid-aligned therein is improved as demonstrated in the Examples as described later.

Furthermore, according to an embodiment of the invention, there is provided a method of manufacturing such an optical device. A solution having the foregoing polymerizable liquid crystal monomer and photopolymerization initiator dissolved therein is first coated and fabricated on an alignment processed surface; and the coated and fabricated solution is then heat treated, thereby hybrid-aligning the polymerizable liquid crystal monomer. Thereafter, the hybrid-aligned polymerizable liquid crystal monomer is three-dimensionally crosslinked upon irradiation of radiations.

Moreover, according to an embodiment of the invention, there is provided a liquid crystal display having a retardation layer made of such an optical device built thereinto, in particular a liquid crystal display having this retardation layer provided inside a liquid crystal cell having a liquid crystal layer interposed between two substrates.

In accordance with the foregoing embodiments according to the invention, it becomes possible to improve the heat resistance of an optical device having a polymerizable liquid crystal monomer hybrid-aligned therein. According to this, it becomes possible to provide, as a retardation layer, an optical device having a polymerizable liquid crystal monomer hybrid-aligned therein in a liquid crystal cell which is required to have heat resistance.

DETAILED DESCRIPTION OF THE PREFERRED EMBODIMENTS

Embodiments of the invention are hereunder explained.

<Polymerizable Liquid Crystal Composition>

The polymerizable liquid crystal composition contains (a) a polymerizable liquid crystal monomer and (b) a photopolymerization initiator and besides, (c) a surfactant.

(a) Polymerizable Liquid Crystal Monomer:

The polymerizable liquid crystal monomer is a polymerizable liquid crystal monomer capable of achieving hybrid alignment on an alignment film, and a compound containing at least two polymerizable functional groups is used. Examples of the compound containing two polymerizable functional groups include compounds represented by the foregoing general formula (3).

Though two or more compounds represented by the general formula (3) are contained from the viewpoint that a crystal is hardly deposited at room temperature, it is preferable that three or more compounds represented by the general formula (3) are contained.

From the standpoint that the heat resistance is ensured and from the standpoint that a crystal is hardly deposited at room temperature, the polymerizable liquid crystal monomer represented by the general formula (3) is contained in an amount of 60% by mass or more, preferably 65% by mass or more, and more preferably 70% by mass or more.

The alignment properties of the polymerizable liquid crystal monomer may be improved by using a nematic liquid crystal represented by any of the following general formulae (4)-1 to (4)-4 in combination with the polymerizable liquid crystal monomer represented by the general formula (3). Two or more nematic liquid crystals represented by these general formulae (4)-1 to (4)-4 may be used.

General Formula (4)-1

General Formula (4)-2

-continued

General Formula (4)-3

General Formula (4)-4

However, in the general formulae (4)-1 to (4)-4, n is from 2 to 10.

(b) Photopolymerization Initiator:

The photopolymerization initiator is a compound represented by the foregoing general formula (1) or (2). Specific examples thereof include IRGACURE 907, manufactured by Ciba Specialty Chemicals, which is one example of the general formula (1); and IRGACURE 369, manufactured by Ciba Specialty Chemicals, which is one example of the general formula (2).

If desired, a combination of plural kinds of this photopolymerization initiator may be used. Further, other photopolymerization initiators may be added. The amount of addition of the photopolymerization initiator is generally in the range of from 0.01 to 15% by weight, preferably from 0.1 to 12% by weight, and more preferably from 0.5 to 10% by weight.

(c) Surfactant:

A fluorine based surfactant or an acrylic surfactant is used as the surfactant. As the fluorine based surfactant, DMAOP (a trade name of Azmax Co., Ltd.) and so on can be used. As the acrylic surfactant, BYK361 (a trade name of BYK-Chemie), POLYFLOW 461 (a trade name of Kyoeisha Chemical Co., Ltd.), and so on can be used. These surfactants may be used singly or in admixture.

With respect to the amount of addition of the surfactant, the surfactant can be properly added within a range where the alignment of a liquid crystal is not hindered. In general, the amount of addition of the surfactant is preferably from approximately 0.001% by weight to 10% by weight, and more preferably from approximately 0.01% by weight to 5% by weight.

Such a surfactant controls a tilt angle of the polymerizable liquid crystal monomer in an optical device using this polymerizable liquid crystal composition and is able to form an optical device in which the polymerizable liquid crystal monomer is hybrid-aligned at a uniform tilt angle within the surface.

<Optical Device>

Figure 1:
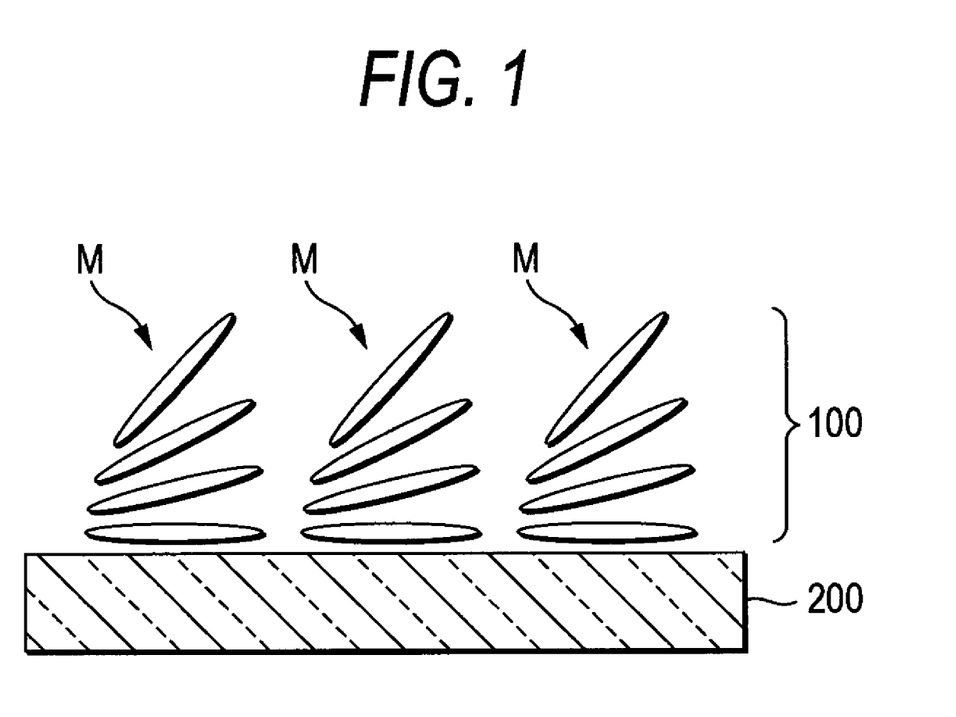
FIG. 1 is a schematic view to explain a configuration of an optical device having a liquid crystal molecule hybrid-aligned therein.

FIG. 1 is a schematic view to show a configuration of an optical device using the foregoing polymerizable liquid crystal composition. As illustrated in FIG. 1, an optical device 100 is provided on an alignment substrate 200 a surface of which has been alignment processed. Examples of such an alignment substrate 200 include a glass substrate a surface of which is covered by an alignment film to which rubbing processing has been applied as the alignment processing and a substrate with alignment ability.

As the alignment film, polyimides, polyamides, polyvinyl alcohol, and the like are usually used. As the rubbing processing, a method in which a rubbing cloth made of a material selected among rayon, cotton, polyamides, polymethyl methacrylate, and the like is wound around a metal roll, and this is rotated in a state that it comes into contact with a film or a film is conveyed in a state that the roll is fixed, thereby rubbing the film surface is usually employed.

The optical device 100 is provided as a layer in which a liquid crystal molecule M is hybrid-aligned on the alignment processed surface of the alignment substrate 200. The optical device 100 is configured such that as it is close to the alignment substrate 200, a major axis of the liquid crystal molecule m becomes parallel to the substrate surface of the alignment substrate 200, whereas as it is far from the alignment substrate 200 upwardly, an angle (pre-tilt angle) formed between the major axis of the liquid crystal molecule M and the substrate surface of the alignment substrate 200 becomes large.

In this optical device 100, the liquid crystal molecule M is made of the foregoing polymerizable liquid crystal monomer (a) of the polymerizable liquid crystal composition, and this polymerizable liquid crystal monomer (a) is three-dimensionally crosslinked in a state of the foregoing hybrid alignment and fixed.

In addition to the polymerizable liquid crystal monomer (a), this optical device 100 contains the foregoing photopolymerization initiator (b) and surfactant (c) each constituting the polymerizable liquid crystal composition.

<Manufacturing Method of Optical Device>

Next, the manufacturing method of the optical device 100 as illustrated in FIG. 1 is described.

First of all, the polymerizable liquid crystal monomer (a), the photopolymerization initiator (b) and the surfactant (c) are dissolved in the foregoing prescribed proportion in a solvent, thereby preparing a coating solution. Next, a coating film is formed by coating the coating solution in a prescribed thickness on the alignment substrate 200. Incidentally, as a method of forming the coating film, various coating methods may be applied.

Next, a heat treatment is carried out, thereby not only drying the coating film on the alignment substrate 200 but hybrid-aligning the polymerizable liquid crystal monomer (a) in the coating film. According to this, the hybrid alignment is achieved without interposing the coating film between substrates having a different alignment direction from each other. On that occasion, the retardation of the optical device 100 is controlled by adjusting the tilt angle of the polymerizable liquid crystal monomer (liquid crystal molecule M) by the heating temperature.

Thereafter, the resultant is taken out at room temperature and irradiated with radiations, thereby three-dimensionally crosslinking the polymerizable liquid crystal monomer (a).

On that occasion, it is preferable that the irradiation of the coating film with radiations is carried out in an inert gas atmosphere of nitrogen ($N_2$) or the like. According to this, the optical device 100 with excellent heat resistance can be obtained without suffering from oxygen hindrance.

Examples of the radiations for irradiating the coating film which can be used include a mercury excitation light source (for example, a low pressure mercury vapor lamp, a high pressure mercury vapor lamp and an ultrahigh pressure mercury vapor lamp) and a xenon light source. It is preferred to select a light source having an intensity peak in a waveband region to which the photopolymerization initiator is highly sensitive.

The irradiation of the coating film with radiations is carried out at a temperature of room temperature or higher and not higher than a clear point of the liquid crystalline monomer. According to this, the optical device 100 having a large crosslinking density and having excellent heat resistance can be prepared without impairing liquid crystallinity (anisotropy). Incidentally, the "clear point" as referred to herein means a temperature of phase transition between a liquid crystal phase and a liquid phase.

Thereafter, a heat treatment is carried out, thereby further advancing the three-dimensional crosslinking. According to this, a tilt-aligned retardation layer with more excellent heat resistance can be obtained. This heat treatment is carried out at 100° C. or higher and not higher than 230° C. for from 10 minutes to 120 minutes. According to this, the optical device 100 which is prevented from yellowing caused due to the heat treatment or deterioration such as a lowering of the retardation amount can be obtained.

It has been confirmed that by using the photo-polymerization initiator represented by the general formula (1) or (2), nevertheless the thus obtained optical device 100 is an optical device having a polymerizable liquid crystal monomer hybrid-aligned therein, its heat resistance is improved as demonstrated in the Examples as described later.

According to this, even in the case where a heat treatment is applied to this optical device 100, the optical device 100 can be kept stably without changing its characteristics before and after this heat treatment. For example, a front retardation and a retardation from a direction tilted to a polar angle direction can be kept stably without being changed before and after the heat treatment.

<Liquid Crystal Display-1>

Figure 2:
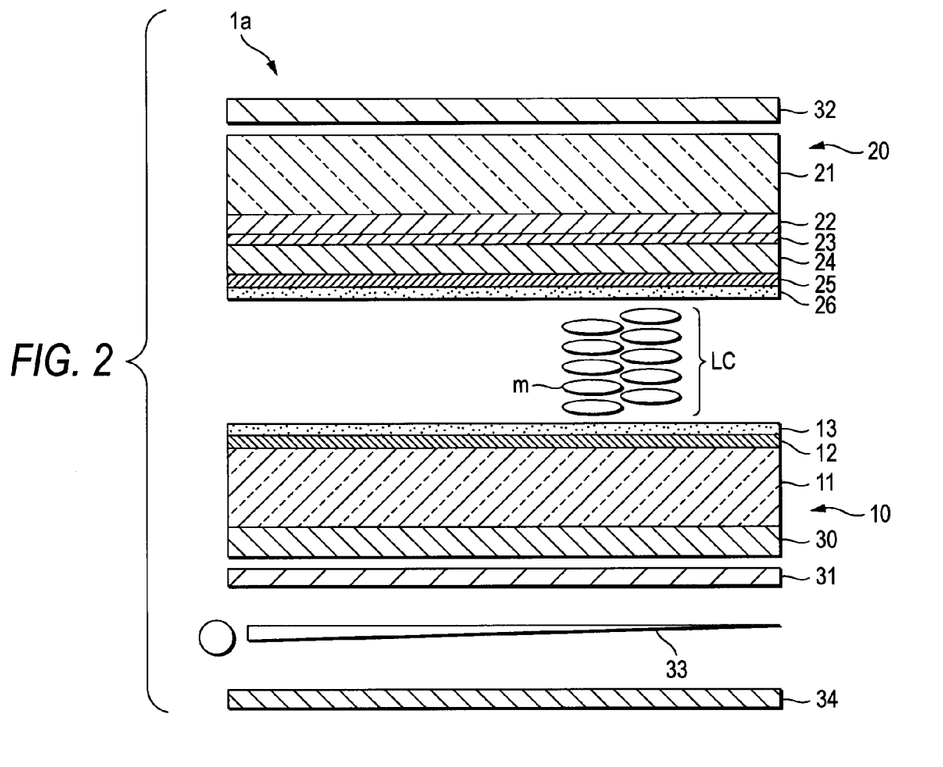
FIG. 2 is a cross-sectional configuration view of First Embodiment of a liquid crystal display according to an embodiment of the invention.

FIG. 2 is a cross-sectional configuration view of First Embodiment of a liquid crystal display according to an embodiment of the invention. A liquid crystal display 1a as illustrated in FIG. 2 is a liquid crystal display 1a of a transmission type which is driven in an ECB mode and includes the foregoing optical device as a retardation layer having a liquid crystal molecule hybrid-aligned therein (hereinafter referred to as "hybrid retardation layer"). Such a liquid crystal display 1a is configured as follows.

That is, the liquid crystal display 1a includes a drive substrate 10, an opposing substrate 20 which is disposed opposite to a device forming surface side of this drive substrate 10, and a liquid crystal layer LC interposed between the drive substrate 10 and the opposing substrate 20. A λ/4 retardation plate 30 is provided in an intimate contact state on an outside surface of the drive substrate 10; and polarizing plates 31 and 32 are provided in a cross-nicol system in an intimate contact state on outside surfaces of the drive substrate 10 and the opposing substrate 20, respectively. A backlight 33 and a reflector plate 34 are disposed outside the polarizing plate 31 disposed in the side of the drive substrate 10.

In the drive substrate 10 of these, a drive electrode layer 12 in which a drive device, for example, TFT (thin film transistor) and a pixel electrode connected thereto are formed for every pixel is provided on a surface faced at the liquid crystal layer LC of a transparent substrate 11 such as a glass substrate. An alignment film 13 is provided in a state of covering this drive electrode layer 12. This alignment film 13 is, for example, one resulting from applying rubbing processing or alignment processing in a prescribed direction to a transmission axis of the polarizing plate 31 in the side of the drive substrate 10.

On the other hand, in the opposing substrate 20, a color filter 22 of each of R (red), G (green) and B (blue) colors, an alignment film 23, a hybrid retardation layer 24, an opposing electrode 25, and an alignment film 26 are provided in this order on a surface of a transparent substrate 21 such as a glass substrate faced at the liquid crystal layer LC. A non-illustrated alignment film is further provided on the opposing electrode 25. This alignment film is one resulting from applying rubbing processing or alignment processing non-parallel to the alignment film provided in the side of the drive substrate 10.

The optical device 100 as explained with reference to FIG. 1 is used as the hybrid retardation layer 24 having a liquid crystal molecule hybrid-aligned therein; and it is characteristic that this hybrid retardation layer 24 is formed in the side of the liquid crystal layer LC of the transparent substrate 21.

Incidentally, the transparent substrate 21 having the alignment film 23 provided thereon is corresponding to the alignment substrate as explained with reference to FIG. 1. For that reason, the liquid crystal molecule in the hybrid retardation layer 24 is horizontal to the substrate surface in the side of the transparent substrate 21 and is in an alignment state that it rises step-by-step vertically toward the side of the liquid crystal layer LC.

The alignment direction of this hybrid retardation layer 24 is configured such that a residual retardation of the liquid crystal layer LC during applying a voltage to the opposing electrode 25 and the pixel electrode, thereby achieving black displaying and a retardation of the retardation plate (λ/4 retardation plate 30) are substantially offset each other.

The liquid crystal display 1a of such a configuration is one resulting from fabricating and forming the hybrid retardation layer 24 on the transparent substrate 21 via the color filter 22 and subjecting it to in-cell processing.

In the thus configured liquid crystal display 1a, by building the hybrid retardation layer 24 into the liquid crystal display 1a of an ECB mode, the residual retardation of the liquid crystal layer LC in black displaying is dispelled so that it becomes possible to obtain a wide viewing angle.

In particular, because of the configuration that the tilt angle of the liquid crystal molecule is changed in a film thickness direction, when the hybrid retardation layer 24 whose retardation is easily changed by heating is configured by using the foregoing optical device with good heat resistance, even after subjecting it to in-cell processing, sufficient heat resistance is exhibited so that it is possible to keep a required retardation.

As a result, in the liquid crystal display 1a of an ECB mode in which the hybrid retardation layer 24 is provided and an electronic appliance using this liquid crystal display 1a, it is possible to devise to improve alignment properties of the hybrid retardation layer so that displaying with a high contrast can be achieved while keeping a good viewing angle.

By providing this hybrid retardation layer 24 in an upper part of the color filter 22, the hybrid retardation layer 24 also functions as a passivation layer of the color filter 22. According to this, degassing from the color filter 22 can be prevented from occurring.

<Liquid Crystal Display-2>

Figure 3:
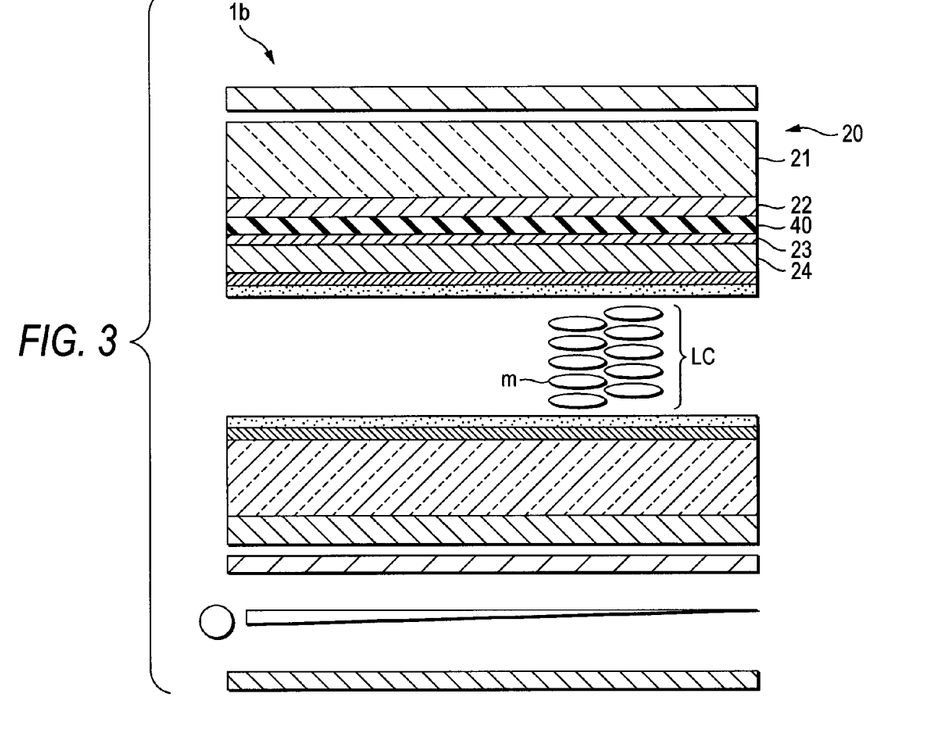
FIG. 3 is a cross-sectional configuration view of Second Embodiment of a liquid crystal display according to an embodiment of the invention.

FIG. 3 is a cross-sectional configuration view of Second Embodiment of a liquid crystal display according to an embodiment of the invention. A difference of a liquid crystal display 1b as illustrated in FIG. 3 from the liquid crystal display 1a as illustrated in FIG. 2 resides in the configuration of the side of the opposing substrate 20. That is, the liquid crystal display 1b is configured such that the color filer 22 on the transparent substrate 21 is covered by a flattened dielectric film 40 and that the alignment film 23 and the hybrid retardation layer 24 are provided in an upper part of this flattened dielectric film 40, and other configuration of the liquid crystal display 1b is the same as in the liquid crystal display 1a of FIG. 2.

By providing the flattened dielectric film 40 in this way, it becomes possible to form the hybrid retardation layer 24 on a flat base surface. According to this, the alignment properties of the hybrid retardation layer 24 can be improved.

<Liquid Crystal Display-3>

Figure 4:
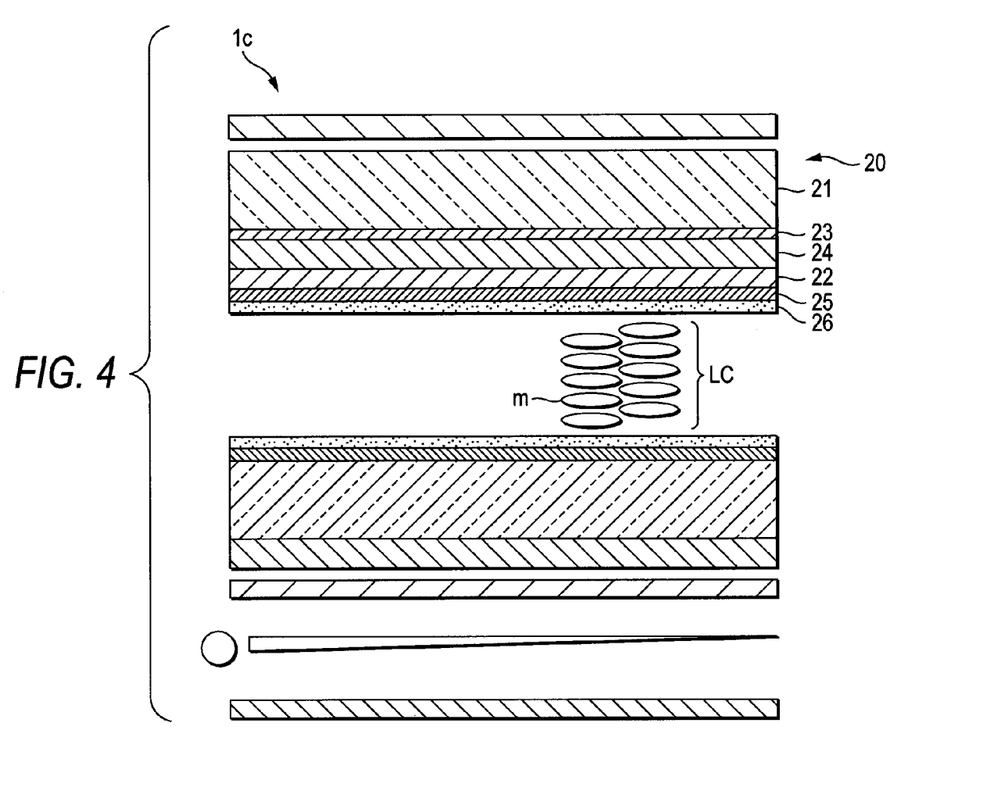
FIG. 4 is a cross-sectional configuration view of Third Embodiment of a liquid crystal display according to an embodiment of the invention.

FIG. 4 is a cross-sectional configuration view of Third Embodiment of a liquid crystal display according to an embodiment of the invention. A difference of a liquid crystal display 1c as illustrated in FIG. 4 from the liquid crystal display 1a as illustrated in FIG. 2 resides in the configuration of the side of the opposing substrate 20. That is, the liquid crystal display 1c is configured such that the alignment film 23 and the hybrid retardation layer 24 are provided directly on the transparent substrate 21, and other configuration of the liquid crystal display 1c is the same as in the liquid crystal display 1a of FIG. 2.

By employing such a configuration, since the base on which the hybrid retardation layer 24 is fabricated and formed is flat, the alignment properties of the hybrid retardation layer 24 can be further improved.

Incidentally, in the foregoing First Embodiment to Third Embodiment, the configuration that the liquid crystal display of an ECB mode in which the hybrid retardation layer 24 is provided as a viewing angle compensation layer is exemplified has been described. However, an embodiment according to the invention is also applicable to a liquid crystal display of a TN mode in which the hybrid retardation layer 24 having been subjected to in-cell processing is provided. In that case, the optical configuration of, for example, a polarizing plate to be disposed inside and outside the liquid crystal cell as described in the foregoing Embodiments may be properly changed such that it is applicable to drive displaying in a TN mode. Also, the hybrid retardation layer 24 may be provided in the same position as in the each of the foregoing Embodiments, and the same effects as in each of the foregoing Embodiments can be obtained.

In the foregoing Embodiments, the configuration that an embodiment according to the invention is applied to a liquid crystal display of a transmission type has been described. However, the liquid crystal display of an embodiment according to the invention is also applicable to a liquid crystal display of a semi-transmission and semi-reflection type. In that case, in a series of steps of forming the hybrid retardation layer 24 by the foregoing preparation method of an optical device, during the irradiation of a coating film made of a polymerizable liquid crystal composition by radiations, a transmission display area and a reflection display area are distinguished into an exposed area and an unexposed area by radiations, respectively by using a mask having a region through which radiations pass and a region where radiations are blocked or reflected. According to this, in the exposed area, the retardation is regulated at a prescribed value by three-dimensionally crosslinking the polymerizable liquid crystal monomer; whereas in the unexposed area, the retardation is regulated at 0 or a prescribed low value without three-dimensionally crosslinking the polymerizable liquid crystal monomer.

In each of the foregoing Embodiments, the configuration that the λ/4 retardation plate 30 is disposed outside the liquid crystal cell has been described. However, this λ/4 retardation layer 30 may be subjected to in-cell processing, too.

In that case, a configuration that the λ/4 retardation layer 30 is, for example, disposed in a lower layer side of the hybrid retardation layer 24 is exemplified. In such a configuration, the λ/4 retardation layer 30 may be formed by using a polymerizable liquid crystal material by the same method as the formation of the hybrid retardation layer, followed by providing the hybrid retardation layer 24 directly in an upper part thereof while making this surface as an alignment surface. Also, an alignment film may be further formed on the λ/4 retardation layer 30, followed by providing the hybrid retardation layer 24 in an upper part thereof.

Incidentally, in that case, since the λ/4 retardation layer 30 to be subjected to in-cell processing is not required to have a hybrid structure, heat resistance is easily obtained as compared with the hybrid retardation layer 24. But, even in such a λ/4 retardation layer 30, it is important to configure the λ/4 retardation layer 30 by selecting a material with good heat resistance.

EXAMPLES

Example 1

The following materials (1) to (5) were mixed to prepare a coating solution for forming an optical device.

(1) Polymerizable Liquid Crystal Monomer:

15 parts by weight of a compound represented by the general formula (3) wherein $Y^1$ and $Y^2$ are each —COO—; $W^1$ and $W^2$ are each —OCO—; p is 4; and q is 4.

(2) Polymerizable Liquid Crystal Monomer:

5 parts by weight of a compound represented by the following structural formula (1).

(3) Photopolymerization Initiator:

1 part by weight of IRGACURE 907 (a trade name of Ciba Specialty Chemicals) as one compound represented by the general formula (1).

(4) Fluorine Based Surfactant:

0.2 parts by weight of DMAOP (a trade name of Azmax Co., Ltd.).

(5) Solvent:

78.8 parts by weight of propylene glycol methyl ethyl ether (PGMEA).

Structural Formula (1)

The prepared coating solution was spin coated on an alignment film AL1254 (a trade name of JSR Corporation) having been subjected to rubbing processing, thereby forming a coating film. Thereafter, the coating film was dried in vacuo (ultimate vacuum: 0.4 Torr) to remove the solvent and then subjected to alignment processing by heating on a hot plate (at 60° C.) for one minute.

Thereafter, the resulting coated film was exposed in nitrogen (oxygen concentration: not more than 0.1%) at an illuminance of 30 mW/cm² for an exposure time of 20 seconds by using an ultrahigh pressure mercury vapor lamp, thereby achieving three-dimensional crosslinking.

Next, the resulting film was heat treated in an oven kept in a nitrogen atmosphere (at 220° C., oxygen concentration: not more than 1%) for 60 minutes.

A thickness of the thus prepared optical device (retardation layer) was measured by a stylus profilometer. As a result, it was found to be 1.1 μm.

Also, a retardation of the optical device (retardation layer) was measured before and after a heat resistance test. The results obtained are shown in Table 1. As the heat resistance test, a heat treatment was carried out in an oven at 220° C. for 6 hours.

TABLE 1

| | | Retardation | | | | | |
| | | Before heat resistance test | | | After heat resistance test | | |
| | Photopolymerization | | Polar angle (°) | | | Polar angle (°) | |
| | initiator | Front | 50 | −50 | Front | 50 | −50 |
| Example 1 | IRGACURE 907: General formula (1) | 80 nm | 165 nm | 20 nm | 76 nm | 157 nm | 19 nm |
| Example 2 | IRGACURE 369: General formula (2) | " | " | " | " | " | " |
| Comparative Example 1 | IRGACURE 651 | 82 nm | — | — | 70 nm | — | — |
| Comparative Example 2 | LUCIRIN TPO | 81 nm | — | — | 67 nm | — | — |

Before the heat resistance test, a retardation of the front was measured and found to be 80 nm; and when inclined along the rubbing axis, a retardation at −50° was 20 nm, whereas a retardation at +50° was 165 nm. Thus, it could be confirmed that a hybrid-aligned retardation layer was formed.

After the heat resistance test, a retardation of the front was 76 nm, and its conversion was 95%. Also, retardation values at −50° and +500 were 19 nm and 157 nm, respectively; and a conversion thereof was 95%, a value of which was smaller than that in the retardation of the front. Thus, it was confirmed that by using a photopolymerization initiator which is characteristic in an embodiment according to the invention, the optical device having a liquid crystal molecule hybrid-aligned therein is excellent in the heat resistance.

Example 2

An optical device was prepared in the same manner as in Example 1, except for changing the photopolymerization initiator (3) as used in Example 1 to IRGACURE 369 (a trade name of Ciba Specialty Chemicals) as one compound represented by the general formula (2) which is characteristic in an embodiment according to the invention. As shown in the foregoing Table 1, with respect to the retardation before and after the heat resistance test, the same results as in Example 1 are revealed. According to this, it was confirmed that by using a photopolymerization initiator which is characteristic in an embodiment according to the invention, the optical device having a liquid crystal molecule hybrid-aligned therein is excellent in the heat resistance.

Comparative Example 1

An optical device was prepared in the same manner as in Example 1, except for changing the photopolymerization initiator (3) as used in Example 1 to IRGACURE 651 (a trade name of Ciba Specialty Chemicals). As shown in the foregoing Table 1, the retardation of the front before and after the heat resistance test was deteriorated from 82 nm to 70 nm at a conversion of 85%.

Comparative Example 2

An optical device was prepared in the same manner as in Example 1, except for changing the photopolymerization initiator (3) as used in Example 1 to LUCIRIN TPO (a trade name of BASF AG). As shown in the foregoing Table 1, the retardation of the front before and after the heat resistance test was deteriorated from 81 nm to 67 nm at a conversion of 83%.

It should be understood by those skilled in the art that various modifications, combinations, sub-combinations and alternations may occur depending on design requirements and other factors insofar as they are within the scope of the appended claims or the equivalents thereof.

What is claimed is:

1. A polymerizable liquid crystal composition comprising:
   a polymerizable liquid crystal monomer represented by the following general formula 3, the polymerizable liquid crystal monomer capable of achieving hybrid alignment on an alignment processed surface:

General Formula (3)

-continued and at least one of a photopolymerization initiator represented by the following general formula (1) or a photopolymerization initiator represented by the following general formula (2):

General Formula (1)

General Formula (2)

wherein,
R1 to R6 each independently represents a hydrogen atom or a methyl group,
$W^1$ and $W^2$ each independently represents a single bond, —O—, —COO—, or —OCO—,
$Y^1$ and $Y^2$ each independently represents —COO— or —OCO—,
p and q each independently represents an integer of from 2 to 18, and a hydrogen atom or atoms in each of the three 1,4-phenylene groups present in the formula may be independently substituted with one or more of an alkyl group, an alkoxy group or an alkanoyl group each having from 1 to 7 carbon atoms, a cyano group, and a halogen atom.

2. The polymerizable liquid crystal composition according to claim 1, wherein a fluorine based surfactant or an acrylic surfactant is contained.

3. An optical device comprising:
a polymerizable liquid crystal monomer hybrid-aligned therein; and
at least one of a photopolymerization initiator represented by the following general formula (1) and a photopolymerization initiator represented by the following general formula (2):

General Formula (1)

General Formula (2)

wherein R1 to R6 each independently represents a hydrogen atom or a methyl group.

4. The optical device according to claim 3, wherein
the polymerizable liquid crystal monomer is represented by the following general formula (3):

General Formula (3)

wherein $W^1$ and $W^2$ each independently represents a single bond, —O—, —COO—, or —OCO—; $Y^1$ and $Y^2$ each independently represents —COO— or —OCO—; p and q each independently represents an integer of from 2 to 18; and a hydrogen atom or atoms in each of the three 1,4-phenylene groups present in the formula may be independently substituted with one or more of an alkyl group, an alkoxy group or an alkanoyl group each having from 1 to 7 carbon atoms, a cyano group, and a halogen atom.

5. The optical device according to claim 3, wherein a fluorine based surfactant or an acrylic surfactant is contained.

6. The optical device according to claim 3, which is configured of a stack structure of a layer having the polymerizable liquid crystal monomer hybrid-aligned therein and other liquid crystal layer.

7. A method of manufacturing an optical device having a polymerizable liquid crystal monomer hybrid-aligned therein, which comprises the steps of:

coating and fabricating a solution of a polymerizable liquid crystal monomer and at least one of a photopolymerization initiator represented by the following general formula (1) and a photopolymerization initiator represented by the following general formula (2) dissolved in a solvent on an alignment processed surface;

thermally processing the coated and fabricated solution to hybrid-align the polymerizable liquid crystal monomer; and three-dimensionally crosslinking the hybrid-aligned polymerizable liquid crystal monomer upon irradiation with radiations:

General Formula (1)

General Formula (2)

wherein R1 to R6 each independently represents a hydrogen atom or a methyl group.

8. The method of manufacturing an optical device according to claim 7, wherein
the polymerizable liquid crystal monomer is represented by the following general formula (3):

independently represents an integer of from 2 to 18; and a hydrogen atom or atoms in each of the three 1,4-phenylene groups present in the formula may be independently substituted with one or more of an alkyl group, an alkoxy group or an alkanoyl group each having from 1 to 7 carbon atoms, a cyano group, and a halogen atom.

9. A liquid crystal display comprising:

a combination of a liquid crystal cell having a liquid crystal layer interposed between a pair of substrates and a retardation layer having a polymerizable liquid crystal monomer hybrid-aligned therein, wherein the retardation layer is one fabricated and formed in a side of the liquid crystal layer in the one-sided substrate of the pair of substrates; and at least one of a photopolymerization initiator represented by the following general formula (1) and a photopolymerization initiator represented by the following general formula (2) is contained:

General Formula (1)

General Formula (2)

wherein R1 to R6 each independently represents a hydrogen atom or a methyl group.

General Formula (3)

wherein $W^1$ and $W^2$ each independently represents a single bond, —O—, —COO—, or —OCO—; $Y^1$ and $Y^2$ each independently represents —COO— or —OCO—; p and q each 10. The liquid crystal display according to claim 9, wherein the polymerizable liquid crystal monomer is represented by the following general formula (3):

General Formula (3)

wherein $W^1$ and $W^2$ each independently represents a single bond, —O—, —COO—, or —OCO—; $Y^1$ and $Y^2$ each independently represents —COO— or —OCO—; p and q each independently represents an integer of from 2 to 18; and a hydrogen atom or atoms in each of the three 1,4-phenylene groups present in the formula may be independently substituted with one or more of an alkyl group, an alkoxy group or an alkanoyl group each having from 1 to 7 carbon atoms, a cyano group, and a halogen atom.

11. The liquid crystal display according to claim 9, wherein the liquid crystal cell is driven in an electrically controlled birefringence mode.

12. The liquid crystal display according to claim 9, wherein the retardation layer is provided on the one-sided substrate via a color filter.

13. The liquid crystal display according to claim 9, wherein the retardation layer is provided on the one-sided substrate via a flattened film.

* * * * *